United States Patent
Hass et al.

(10) Patent No.: US 7,416,200 B2
(45) Date of Patent: Aug. 26, 2008

(54) VEHICLE SUSPENSION ASSEMBLY

(75) Inventors: Tave Hass, Allendale, MI (US); Marc R. Johnson, Grand Rapids, MI (US); Mark R. Molitor, Muskegon, MI (US); Richard L. Conaway, Grand Haven, MI (US)

(73) Assignee: SAF-Holland, Inc., Holland, MI (US)

( * ) Notice: Subject to any disclaimer, the term of this patent is extended or adjusted under 35 U.S.C. 154(b) by 140 days.

(21) Appl. No.: 11/433,741

(22) Filed: May 12, 2006

(65) Prior Publication Data

US 2006/0255557 A1 Nov. 16, 2006

Related U.S. Application Data

(60) Provisional application No. 60/680,558, filed on May 13, 2005.

(51) Int. Cl.
*B60G 9/02* (2006.01)
*B60G 3/14* (2006.01)

(52) U.S. Cl. .................. 280/124.116; 280/124.166; 280/124.11; 280/124.153

(58) Field of Classification Search .......... 280/124.116, 280/124.106, 124.164, 124.109, 124.11, 280/124.153, 124.154, 124.166, 124.157, 280/124.175
See application file for complete search history.

(56) References Cited

U.S. PATENT DOCUMENTS

| | | | |
|---|---|---|---|
| 3,547,214 A | 12/1970 | Ravenel | |
| 3,547,215 A * | 12/1970 | Bird | 280/86.75 |
| 3,889,527 A * | 6/1975 | Wallace | 73/118.1 |
| 4,125,276 A * | 11/1978 | Levasseur | 280/124.108 |
| 4,427,213 A | 1/1984 | Raidel, Jr. | |
| 4,566,719 A | 1/1986 | Van Denberg | |
| 5,002,305 A | 3/1991 | Raidel | |
| 5,037,126 A | 8/1991 | Gottschalk et al. | |
| 5,083,812 A * | 1/1992 | Wallace et al. | 280/124.106 |
| 5,127,668 A | 7/1992 | Raidel | |
| 5,639,110 A * | 6/1997 | Pierce et al. | 280/124.116 |
| 5,820,156 A * | 10/1998 | VanDenberg | 280/676 |
| 6,241,266 B1 * | 6/2001 | Smith et al. | 280/124.116 |
| 6,702,325 B1 * | 3/2004 | Pierce | 280/788 |
| 6,827,193 B2 * | 12/2004 | Conrad et al. | 192/70.252 |
| 6,857,645 B2 * | 2/2005 | Melton et al. | 280/124.116 |
| 7,210,371 B2 * | 5/2007 | Barnett | 74/502.2 |
| 2005/0280239 A1 * | 12/2005 | Johnson | 280/124.116 |

(Continued)

FOREIGN PATENT DOCUMENTS

WO  WO 02/068227  9/2002

*Primary Examiner*—Kevin Hurley
*Assistant Examiner*—Karen J Amores
(74) *Attorney, Agent, or Firm*—Price, Heneveld, Cooper, DeWitt & Litton, LLP

(57) ABSTRACT

A vehicle suspension assembly that includes first and second main beams each having a first end operably coupled to a vehicle frame, and a second end having a cavity formed therein, and first and second extension members each having an aperture extending therethrough, wherein the first and second extensions are interference-fit within and extend outwardly from the cavity of the first and second main beams, respectively. The assembly further including a torsion member having apertured first and second ends that receive the first and second extension members therein, and threaded mechanical fasteners extending through the apertures of the first and second extension members and engage nuts that are frictionally engaged by the first and second main beams.

26 Claims, 4 Drawing Sheets

U.S. PATENT DOCUMENTS

2006/0017252 A1* 1/2006 Oki et al. .............. 280/124.106
2006/0255557 A1* 11/2006 Hass et al. ............ 280/124.116
2007/0114746 A1* 5/2007 Tucker ................ 280/124.116

* cited by examiner

VEHICLE SUSPENSION ASSEMBLY

CROSS REFERENCE TO RELATED APPLICATION

This application claims the benefit of U.S. Provisional Application No. 60/680,558, filed May 13, 2005, entitled VEHICLE SUSPENSION ASSEMBLY, which is hereby incorporated herein by reference in its entirety.

BACKGROUND OF THE PRESENT INVENTION

The present invention relates to a vehicle suspension assembly, and in particular to a heavy-duty suspension system with increased load capacity and decreased weight.

Various suspension systems utilizing air springs have been developed for semi-tractor trailers and other heavy vehicles. These systems are typically designed to control the position of the chassis relative to an associated axle and to cushion any movement of the axle with respect to the chassis frame. Although these systems provide excellent chassis control over a wide range of loading conditions, conventional air spring systems typically do not offer acceptable resistance to vehicle roll, as is often experienced when the vehicle turns, nor do they offer acceptable resistance to lateral shifting of the vehicle, such as when the vehicle accelerates or decelerates.

While specialized components have been added to air spring systems to reduce roll and lateral shift, many of these components add significant weight and cost to the associated suspension system without greatly reducing the roll and lateral shift. Specifically, these designs typically incorporate single-piece trailing arms that require materials meeting torsional and sheer strength requirements, but that also may be tapped and threaded as required. Further, many of these components include complicated designs that are not only expensive to manufacture, but are also difficult to install or replace should damage to the component or related equipment occur. One particular assembly includes stabilizing the related suspension system by securing a torsional beam between a pair of trailing arms by bolts that extend through the torsional beam and into threaded apertures located in the ends of the beams. This particular assembly requires large securing bolts adapted to withstand significant torsional and sheering forces, and further requires the replacement or retapping of a trailing arm should the threads within the bolt receiving aperture become damaged or worn.

There is a need for a lightweight and inexpensive air spring suspension system that resists roll and lateral shift, will not significantly impact the ride-cushioning characteristics of such suspension system, provides relative increase of structural integrity, and that can further be maintained and repaired quickly and cost effective.

SUMMARY OF THE INVENTION

One aspect of the present invention is a vehicle suspension assembly comprising a first main beam having a first end operably coupled to a vehicle frame, and a second end having a cavity formed therein, a first extension member having an aperture extending therethrough, wherein the first extension is located within and extends outwardly from the cavity of the first main beam, a second main beam having a first end operably coupled to a vehicle frame, and a second end with a cavity formed therein, and a second extension member having an aperture extending therethrough, wherein the second extension is located within and extends outwardly from the cavity of the second main beam. The suspension assembly also includes a torsion member having a first end with a first aperture that receives the first extension member therein, and a second end with a second aperture that receives the second extension member therein. The suspension assembly further includes a first threaded mechanical fastener extending through the aperture of the first extension member and engaging a first nut frictionally engaged by the first main beam thereby coupling the first end of the torsion member with the second end of the first main beam, and a second threaded mechanical fastener extending through the aperture of the second extension member and engaging a second nut frictionally engaged by the second main beam, thereby coupling the second end of the torsion member with the second end of the second main beam.

Another aspect of the present invention is a method for constructing a main beam assembly for a vehicle suspension assembly that comprises providing a main beam having a first end adapted to be operably coupled to a vehicle frame, and a second end that has an integrally formed cavity therein, and providing an extension member having a first end, a second end adapted to couple with a torsion member of a vehicle suspension assembly, and an aperture extending between the first and second ends of the extension member. The method further includes coupling the extension member with the main beam by compression-fitting the first end of the extension member in the cavity of the main beam, such that the second end of the extension member extends outward from the cavity of the main beam.

Yet another aspect of the present invention is a vehicle suspension assembly comprising a first main beam that has a first end operably couplable to a vehicle frame, and a second end that has an inwardly extending passage, wherein at least a portion of the passage frictionally engages a first portion of a first fastener, thereby preventing rotation of the first portion of the first fastener, and a second main beam has a first end operably couplable to a vehicle frame, and a second end has an inwardly extending passage, wherein at least a portion of the passage of the second main beam frictionally engages a first portion of a second fastener. The suspension assembly also includes a torsion member having a first end with an aperture extending therethrough and that is operably coupled with the second end of the first main beam by a second portion of the first fastener, wherein the first fastener extends through the aperture of the first end of the torsion member and the passage of the first main beam and is coupled with the first portion of the first fastener, and a second end with an aperture extending therethrough and is operably coupled with the second end of the second main beam by a second portion of the second fastener, wherein the second fastener extends through the aperture of the second end of the torsion member and the passage of the second main beam and is coupled with the first portion of the second fastener.

The present inventive vehicle suspension assembly maintains the ride-cushioning characteristics of an air spring suspension system, while simultaneously increasing roll and lateral shift resistance. The weight of the assembly is minimized by allowing the use of different materials to construct a single trailing arm or beam. Further, relatively longer and smaller diameter bolts are utilized that are allowed to "stretch" during assembly, thereby compensating for wear on components that may create gaps in the suspension assembly during use. Moreover, by interference-fitting the extension member into the main beam, within a separate component that is then welded to the main beam, potential relaxing of compression loads in the joint between the extension member and the beam is prevented.

The addition of a pocket or passage that can secure a nut on the bottom side of the main beam aids in assembly as suspension assemblies are typically constructed upside down, and further eliminates the need for a wrench to secure the fastener by frictionally securing a plurality of sides of a fastener. Further, the downward opening orientation of the passage facilitates the drainage of water, snow, and debris from the pocket during normal operating conditions, thus reducing the potential for corrosion. Moreover, the present inventive vehicle suspension assembly is efficient to make and use, economical to manufacture and repair, capable of a long operating life, and particularly well-adapted for the proposed use.

These and other advantages of the invention will be further understood and appreciated by those skilled in the art by reference to the following written specification, claims and appended drawings.

DETAILED DESCRIPTION OF THE PREFERRED EMBODIMENTS

Figure 1A:
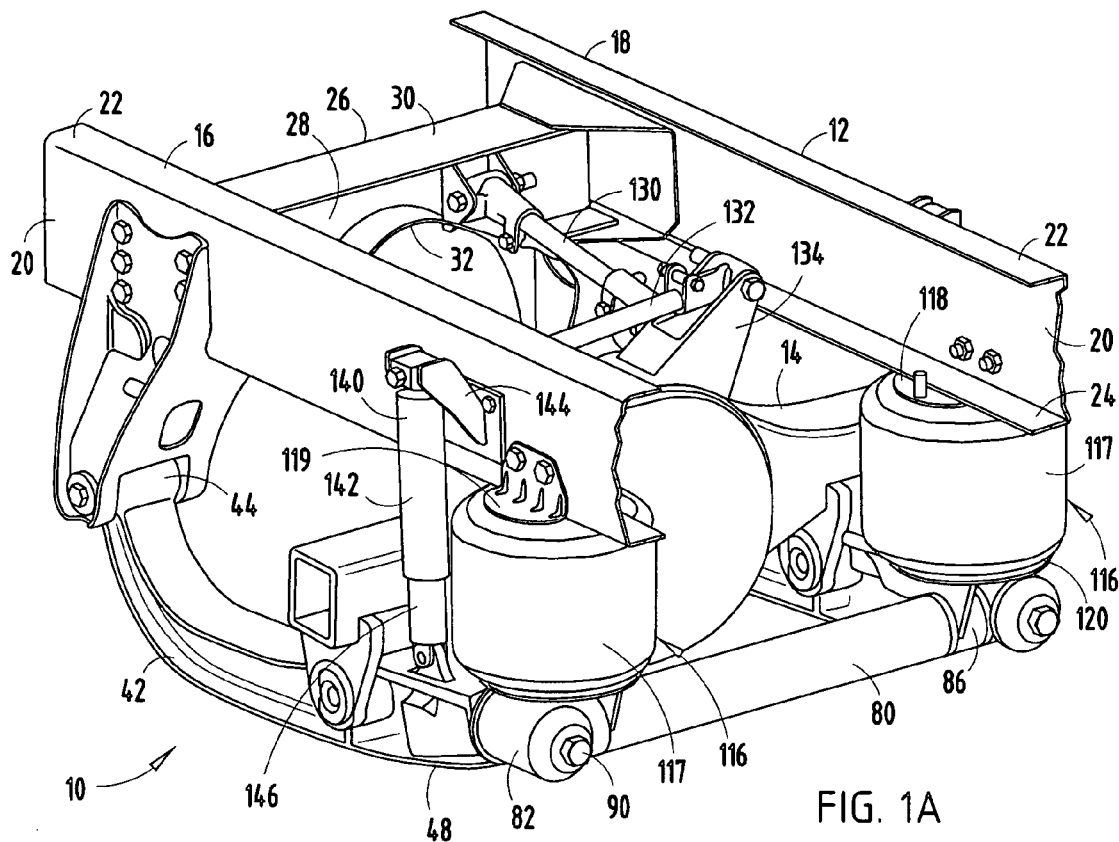
FIG. 1A is a top and front side perspective view of the vehicle frame supported by a vehicle suspension assembly embodying the present invention.
Figure 1B:
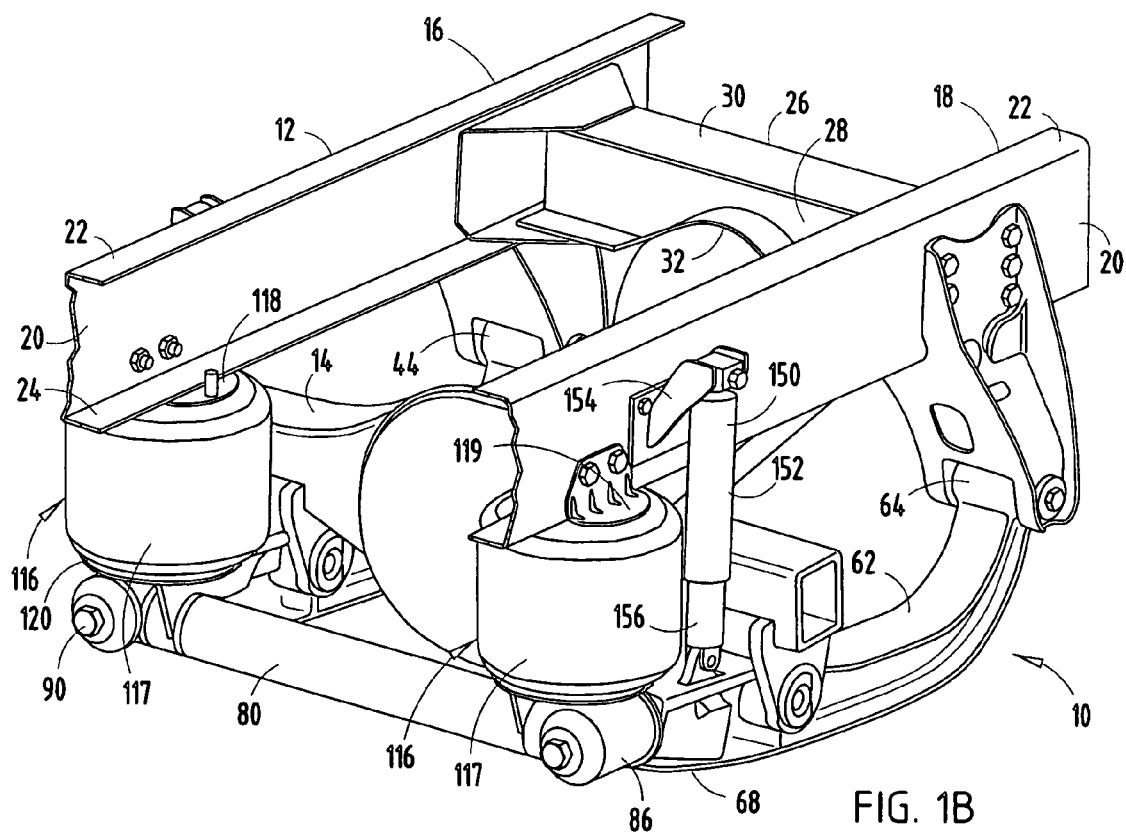
FIG. 1B is a top and second side perspective view of the vehicle frame supported by the vehicle suspension assembly.
Figure 2:
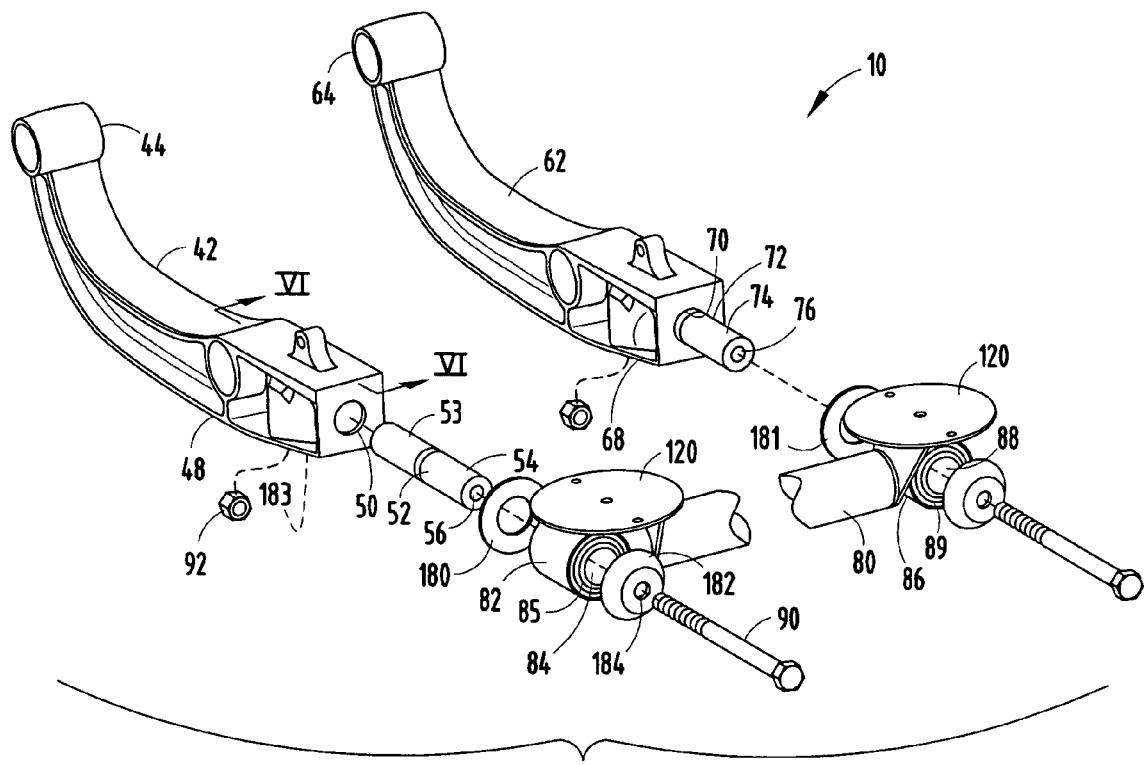
FIG. 2 is an exploded perspective view of a pair of main beam assemblies of the suspension assembly.
Figure 4:
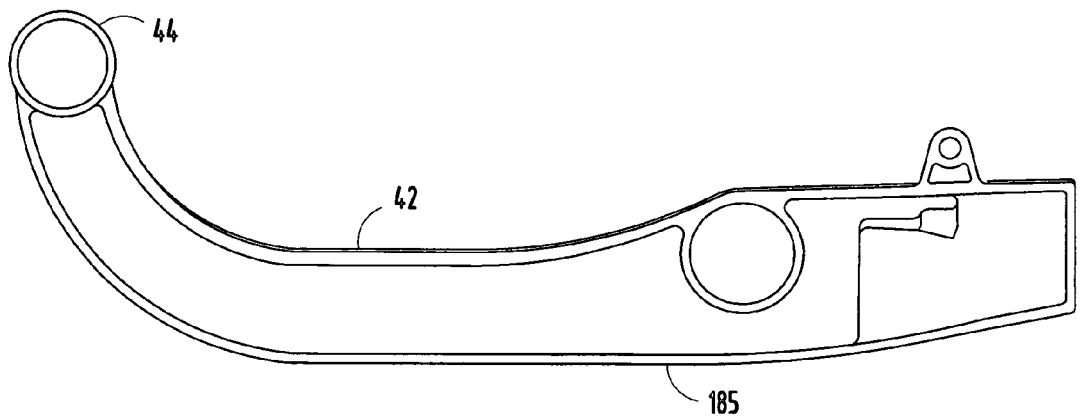
FIG. 4 is a side elevational view of a main beam.

For purpose of description herein the terms "upper", "lower", "right", "left", "rear", "front", "vertical", "horizontal" and derivatives thereof shall relate to the invention as oriented in FIGS. 1 and 4. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIGS. 1A and 1B) generally designates a vehicle suspension assembly embodying the present invention, and supporting a vehicle frame 12 above a vehicle axle 14 and a plurality of associated ground contacting wheels (not shown). In the illustrated example, the vehicle frame 12 includes a first rail member 16, and a second rail member 18 extending substantially parallel to the first rail member 16. The first rail member 16 and the second rail member 18 are each provided a C-shaped cross-sectional configuration including a side wall 20, a top wall 22 and a bottom wall 24. The vehicle frame 12 further includes a lateral beam 26 extending orthogonal to the first rail member 16 and the second rail member 18. The lateral beam 26 is provided an I-shaped cross-sectional configuration including a center wall 28, a top wall 30 and a bottom wall 32. The suspension assembly 10 further includes a pair of air springs 116 located between the first and second rail members 16, 18 and the axle 14, respectively. Each air spring 116 includes a flexibly resilient bladder 117, an upper plate 118 fixedly attached to the associated rail member 16, 18 via a connecter bracket 119, and a bottom plate member 120 fixedly attached to a torsion member, as described below. It should be further noted that the suspension assembly 10 as disclosed herein may be utilized in a plurality of configurations including hydraulic suspension assemblies, coil spring suspension assemblies, air ride suspension assemblies, two-bag air ride suspension assemblies, four-bag air ride suspension assemblies, and the like. It should be noted that the suspension assembly 10 may be used to support other configurations of vehicle frames, and that the vehicle frame 12 is utilized as an example only.

Figure 5:
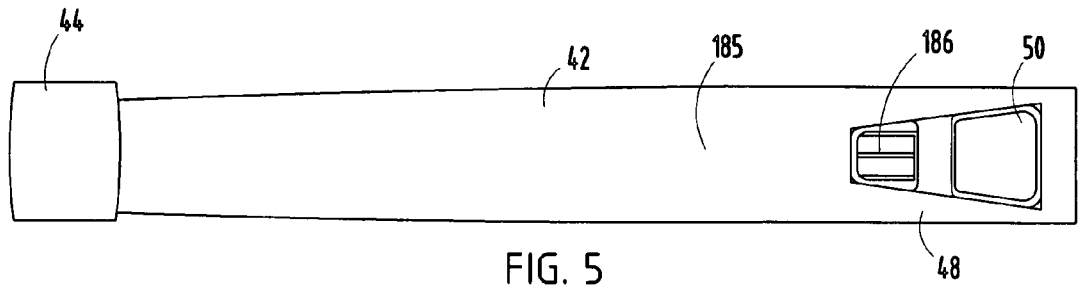
FIG. 5 is a bottom elevational view of the main beam.

The vehicle suspension assembly 10 includes a first main beam 42 (FIG. 4) having a first end 44 operably coupled to the frame 12, and a second end 48 with a cavity 50 (FIG. 5) formed therein, and a first extension member 52 having a first end 53, a second end 54, and an aperture 56 extending therethrough. The suspension assembly 10 also includes a second main beam 62 having a first end 64 operably coupled to a vehicle frame 12, and a second end 68 with a cavity 70 formed therein, and a second extension member 72 having a first end (not shown), a second end 74, and an aperture 76 extending therethrough. The assembly 10 further includes a torsion member 80 having a first end 82 with a first aperture 84 containing a bushing 85 that receives the first extension member 52 therein, and a second end 86 with a second aperture 88 containing a bushing 89 that receives the second extension member 72 therein. Preferably, the materials utilized to construct the first and second extension members 52, 72 are different than the materials used to construct the main beams 42, 62, with the extensions 52, 72 being constructed of a strong, wear-resistant material, and the main beams 42, 62 being constructed of a strong, relatively lightweight material.

The suspension assembly 10 further includes a control arm 130 pivotally connected on one end to a top portion of the axle 14 and pivotally connected on the other end to the center wall 28 of the lateral beam 26 of the frame 12. A track arm 132 is pivotally connected on one end to a support bracket 134 on a top portion of the axle 14 and on the other end to the side wall 20 of the first rail member 16. A top end 140 of a shock absorber 142 is pivotally connected to a support bracket 144 fixedly attached to the side wall 20 of the first rail member 16. A bottom end 146 is pivotally connected to a top portion of the second end 48 of the first main beam 42. Similarly, a top end 150 of a shock absorber 152 is pivotally connected to a support bracket 154 fixedly attached to the side wall 20 of the second rail member 18. A bottom end 156 is pivotally connected to a top portion of the second end 68 of the second main beam 62. In addition, the axle 16 is pivotally connected to the first main beam 42 and the second main beam 62.

In assembly, the first and second main beams 42, 62, are produced by casting or forging the main beams from an alloy such as steel. The first end 53 of the first extension member 52 is inserted into the cavity 50 such that the second end 54 extends outwardly from the cavity 50, and is fixedly secured inside the cavity 50 of the first main beam 42 by compression-fitting, such as shrink-fitting, press-fitting, and the like, or adhering, or a combination thereof. In a similar fashion, the first end 73 of the second extension member 72 is inserted into the cavity 70 such that the second end 74 extends outwardly from the cavity 70, and is fixedly secured inside the cavity 70 of the second main beam 62. A pair of washers 180, 181 each having an aperture with a diameter slightly larger than the outside diameter of the first and second extensions 52, 72, respectively, are positioned over the first extension member 52, 72.

Figure 6:
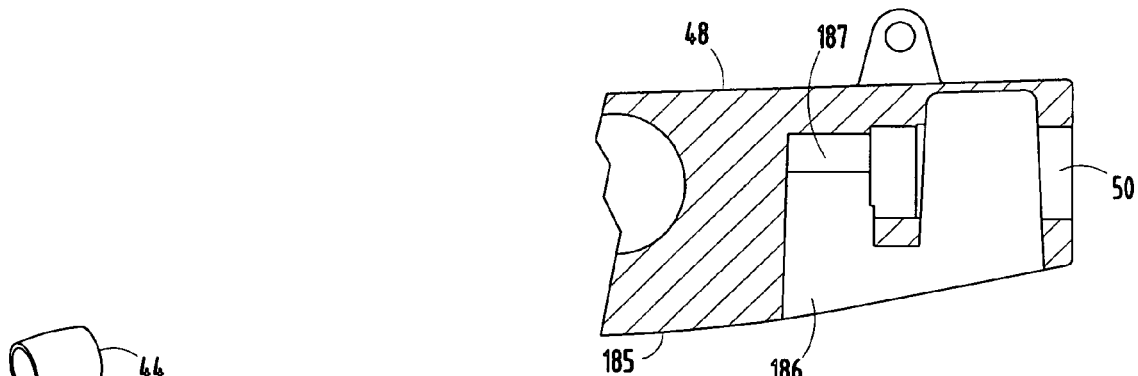
FIG. 6 is a partial cross-sectional view of a main beam taken through line VI-VI, FIG. 2.

The first aperture 84 of the torsion member 80 is inserted over the first extension 52 and abuts the first washer 180. A bell-shaped washer or keeper 182, having a centrally located aperture 184 and an outer diameter larger than the inside diameter of the first aperture 84 of the torsion member 80, and preferably a diameter that equal to an outer diameter of the first end 82 of the torsion member 80, is located on a distal end of the aperture 84 away from the first main beam 42. A first nut 92 is inserted into a pocket or passage 186 (FIGS. 5 and 6) extending into a bottom surface 185 of the first main beam 42. The pocket 186 frictionally secures a plurality of sides of the first nut 92, such that the first nut 92 cannot be rotated within the pocket 186. Preferably, the pocket 186 has four internal sides 187 hexagonally aligned and adapted to abut four sides of a hexagonally-shaped nut 92. A bolt 90 is inserted into the aperture 184 of the keeper 182, through the aperture 56 of the first extension member 52, and engages the first nut 92 inside the pocket 186, thereby securing the washer 180, the keeper 182, and the first end 82 of the torsion member 80 to the second end 48 of the first main beam 42. In the illustrated example, the keepers 182 provide uniform loading about the perimeter of the associated bushings 85, 89, thereby reducing the possibility of clamp load loss. Further, it should be noted that the diameter of the each of the keepers 182 is closely toleranced to the diameter of the extensions 52, 72, thereby reducing the amount of torsion transmitted from the beam 42, 62 to the bolts 90. The second end 86 of the torsion member 80 is secured to the second end 68 of the second main beam 62 in a manner similar to as described above with regard to the first end 84 of the torsion member 80 and the first main beam 42. Alternatively, the downwardly-opening pocket 186 is replaced by a sidewardly-opening pocket 190 (FIG. 7) that extends into a forwardly-extending arrester 192. The pocket 190 is defined by top and bottom walls 194 that abut the sides of the nut 92 when inserted into the pocket 190. It is noted that the illustrated example of FIG. 7 is an example of a single-piece formed beam 42a and extension 52a.

Figure 3:
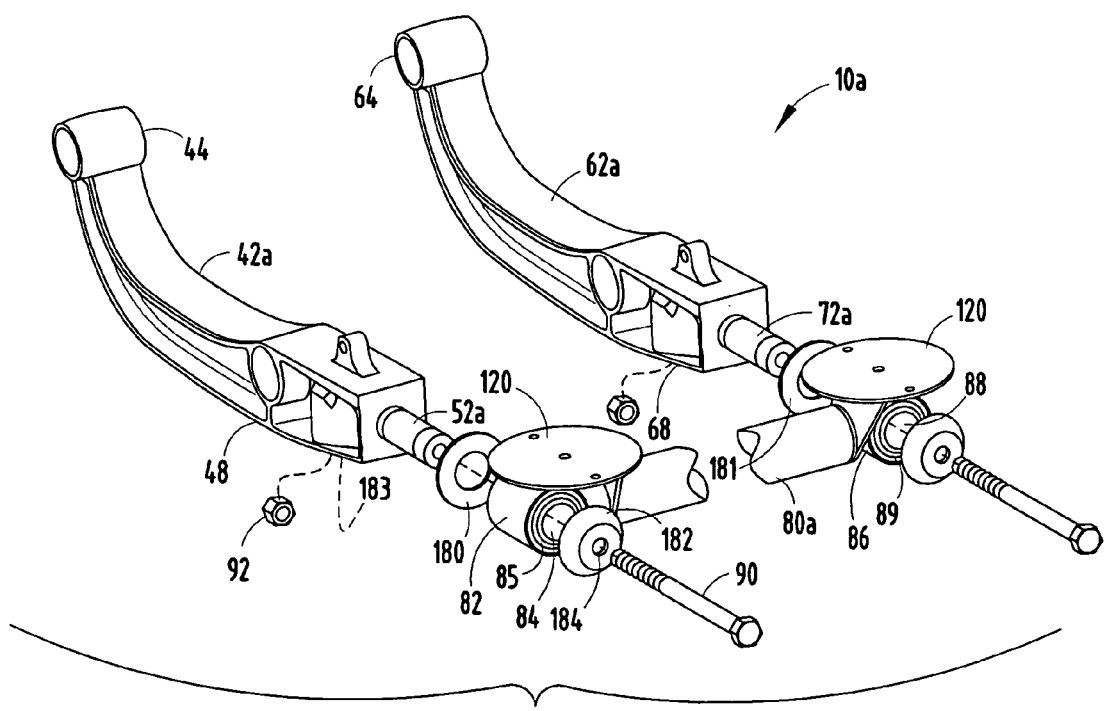
FIG. 3 is an exploded perspective view of a first alternate embodiment of the main beam assemblies.

An alternative embodiment of the suspension assembly 10a (FIG. 3) comprises first and second main beams 42a, 62a that include integrally molded first and second extension members 52a, 72a. In the illustrated example, the main beams 42a, 62a are formed from the same material as the extension members 52a, 72a, thereby allowing a thinner cross-sectional thickness for the main beams 42a, 62a while maintaining lateral compliance, and further reducing the material proximate the interface of the extension members 52a, 72a with the main beams 42a, 62a. The main beams 42a, 62a with the extension members 52a, 72a are adapted to engage and couple with the torsion member 80a in a similar manner to that of the main beams 42, 62 and the torsion member 80, as described above.

Figure 7:
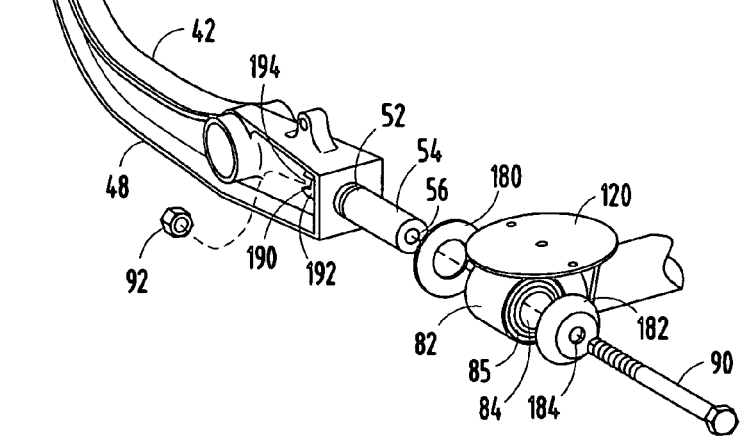
FIG. 7 is an exploded view of a second alternative embodiment of the main beam assemblies
Figure 8:
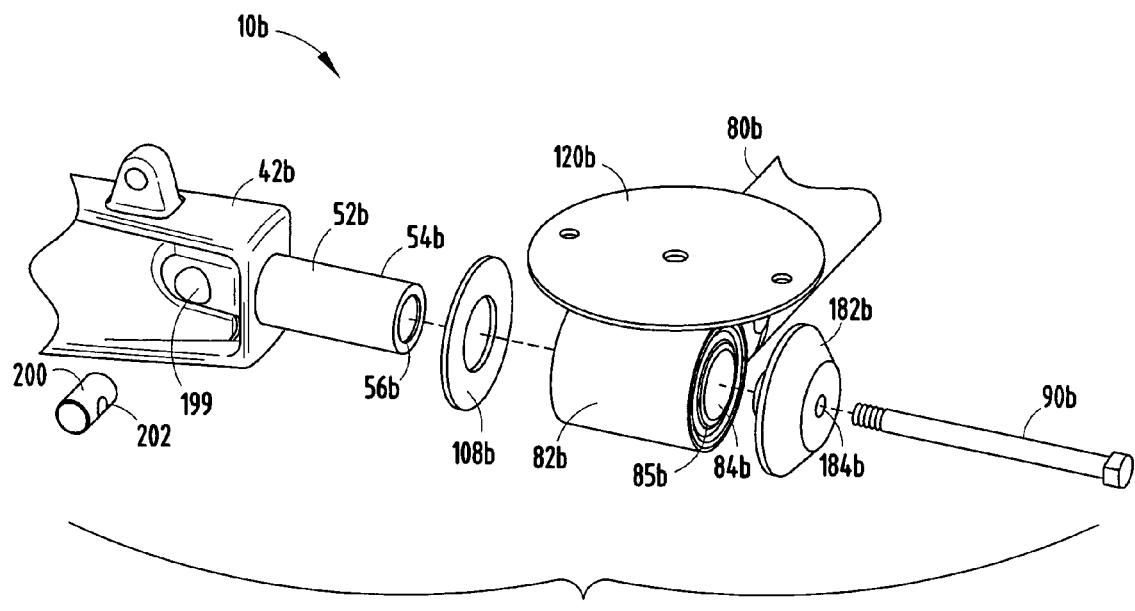
FIG. 8 is an exploded perspective view of a third alternative embodiment of the main beam assembly.
Figure 9:
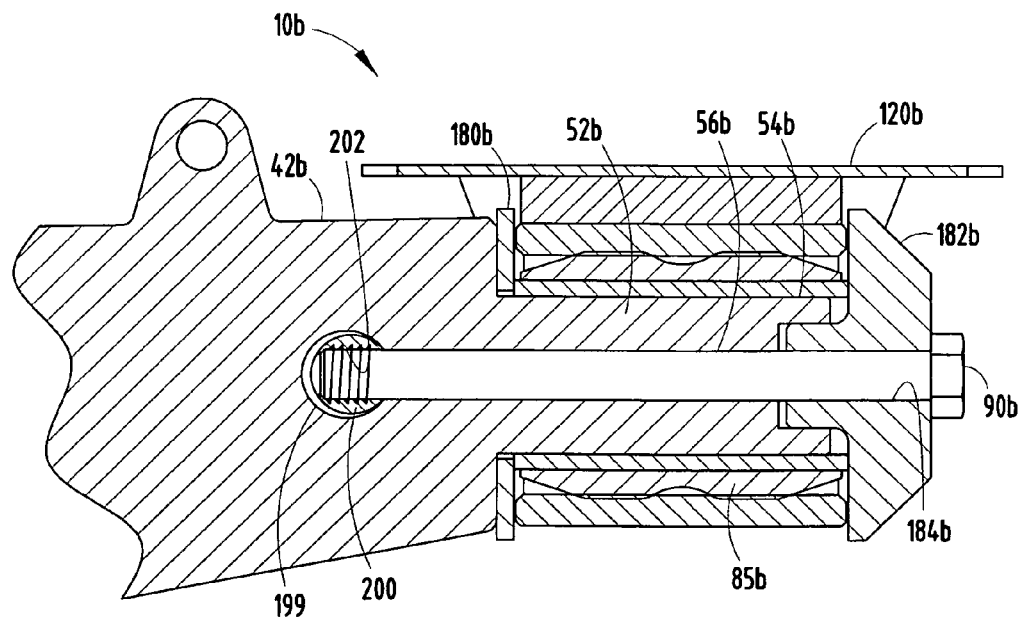
FIG. 9 is a cross-sectional view of the third embodiment of the main beam assembly.

Another alternative embodiment of the suspension assembly 10b (FIGS. 8 and 9) is similar to the suspension assembly 10 illustrated in FIG. 7, with the most notable exception being the configuration of the pocket and associated nut. Since suspension assembly 10b is similar to the previously described suspension assembly 10, similar parts appearing in FIGS. 1A-2 and 7 and FIG. 8, respectively, are represented by the same, corresponding reference numeral, except for the suffix "b" in the numerals of the latter. In the illustrated example, each of the main beams 42b includes a horizontally-extending, cylindrically-shaped aperture 199 that receives a cylindrical rod nut 200 having a threaded aperture 202 extending orthogonally to a longitudinal axis of the rod nut 200. Although the associated extension member 52b is illustrated as being integrally formed within the main beam 42b, it is noted that these components may be separately formed. Assembly is accomplished similarly to that discussed above with the bolt 90b extending through the keeper 182b, the first end 82b of the torsion member 80b, and the extension 52b, and threadably received within the threaded aperture 202 of the rod nut 200.

The present inventive vehicle suspension assembly described herein provides an air spring suspension system with increased roll and lateral shift resistance. Further, the assembly is lightweight, capable of a long operating life, and is particularly well adapted for the proposed use.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A vehicle suspension assembly, comprising:
   a first main beam having a first end operably coupled to a vehicle frame, and a second end having a cavity formed therein;
   a first extension member having an aperture extending therethrough, wherein the first extension is located within and extends outwardly from the cavity of the first main beam;
   a second main beam having a first end operably coupled to a vehicle frame, and a second end having a cavity formed therein;
   a second extension member having an aperture extending therethrough, wherein the first extension is located within and extends outwardly from the cavity of the first main beam;
   a torsion member having a first end with a first aperture that receives the first extension member therein, and a second end with a second aperture that receives the second extension member therein;
   a first threaded mechanical fastener that extends through the aperture of the first extension member and engages a first nut abutting the first main beam, thereby coupling the first end of the torsion member with the second end of the first main beam; and
   a second threaded mechanical fastener that extends through the aperture of the second extension member and engages a second nut abutting the second main beam, thereby coupling the second end of the torsion member with the second end of the second main beam.

2. The vehicle suspension assembly as set forth in claim 1, wherein the first nut is disposed in a pocket in the first main beam.

3. The vehicle suspension assembly as set forth in claim 2, wherein the pocket is disposed on a bottom side of the first main beam, and wherein the pocket is adapted to frictionally secure a plurality of sides of the first nut.

4. The vehicle suspension assembly as set forth in claim 3, wherein a washer is disposed on a distal end of the first aperture of the torsion member relative to the first main beam.

5. The vehicle suspension assembly as set forth in claim 4, wherein the washer is bell-shaped and includes a diameter substantially equal to or greater than an outer diameter of the first end of the torsion member.

6. The vehicle suspension assembly as set forth in claim 5, wherein the first extension is shrink-fit into the aperture of the first main beam, thereby securing the first extension with the first main beam, and wherein the second extension is shrink-fit into the aperture of the second main beam, thereby securing the second extension with the second main beam.

7. The vehicle suspension assembly as set forth in claim 6, wherein the first and second extensions each comprise of a cylindrical tube.

8. The vehicle suspension assembly as set forth in claim 1, wherein a pocket is disposed on a bottom side of the first main beam, and wherein the pocket is adapted to frictionally secure the first nut.

9. The vehicle suspension assembly as set forth in claim 1, wherein a washer is disposed on a distal end of the first aperture of the torsion member relative to the first main beam.

10. The vehicle suspension assembly as set forth in claim 9, wherein the washer is bell-shaped and includes a diameter substantially equal to or greater than an outer diameter of the first end of the torsion member.

11. The vehicle suspension assembly as set forth in claim 1, wherein the first extension is shrink-fit into the aperture of the first main beam, thereby securing the first extension with the first main beam, and wherein the second extension is shrink-fit into the aperture of the second main beam, thereby securing the second extension with the second main beam.

12. The vehicle suspension assembly as set forth in claim 1, wherein the first and second extensions each comprise of a cylindrical tube.

13. The vehicle suspension assembly as set forth in claim 1, wherein the first and second main beams comprise a first material, and wherein the first and second extension comprise a second material that is different than the first material.

14. The vehicle suspension assembly as set forth in claim 1, wherein each nut comprises a cylindrical cross-sectional configuration.

15. The vehicle suspension as set forth in claim 1, wherein the nuts frictionally engage the first and second main beams, respectively.

16. A method for constructing a main beam assembly for a vehicle suspension assembly, the method comprising:
providing a main beam having a first end adapted to be operably coupled to a vehicle frame, and a second end having an integrally formed cavity therein;
providing an extension member having a first end, a second end adapted to couple with a torsion member of a vehicle suspension assembly, and an aperture extending between the first and second ends of the extension member; and
coupling the extension member with the main beam by interference-fitting the first end of the extension member in the cavity of the main beam, such that the second end of the extension member extends outward from the cavity of the main beam.

17. The method as set forth in claim 16, wherein the step of fitting the first end of the extension member comprises shrink-fitting the first end of the extension member inside the cavity of the main beam by heating the temperature of the main beam relative to the temperature of the extension member.

18. The method as set forth in claim 16, wherein the step of fitting the first end of the extension member comprises press-fitting the first end of the extension member inside the cavity of the main beam.

19. The method as set forth in claim 16, wherein the step of fitting the first end of the extension member comprises adhering the first end of the extension member inside the cavity of the main beam.

20. The method as set forth in claim 16, wherein the step of providing the main beam includes providing the main beam comprising a first material, and wherein the step of providing the extension member includes providing the extension member comprising a second material that is different than the first material.

21. A vehicle suspension assembly, comprising:
a first main beam having a first end operably couplable to a vehicle frame, and a second end having an inwardly and downwardly extending passage, wherein at least a portion of the passage frictionally engages a first portion of a first fastener, thereby preventing rotation of the first portion of the first fastener;
a second main beam having a first end operably couplable to a vehicle frame, and a second end having an inwardly and downwardly extending passage, wherein at least a portion of the passage of the second main beam frictionally engage a first portion of a second fastener; and
a torsion member having a first end with an aperture extending therethrough and operably coupled with the second end of the first main beam by a second portion of the first fastener that extends through the aperture of the first end of the torsion member and the passage of the first main beam and is coupled with the first portion of the first fastener, and a second end with an aperture extending therethrough and operably coupled with the second end of the second main beam by a second portion of the second fastener that extends through the aperture of the second end of the torsion member and the passage of the second main beam and is coupled with the first portion of the second fastener.

22. A vehicle suspension assembly, comprising:
a first main beam having a first end operably couplable to a vehicle frame, and a second end having an inwardly extending and at least partially hexogonally shaped passage, wherein at least a portion of the passage frictionally engages a first portion of a first fastener, thereby preventing rotation of the first portion of the first fastener;
a second main beam having a first end operably couplable to a vehicle frame, and a second end having an inwardly extending and at least partially hexogonally shaped passage, wherein at least a portion of the passage of the second main beam frictionally engage a first portion of a second fastener; and
a torsion member having a first end with an aperture extending therethrough and operably coupled with the second end of the first main beam by a second portion of the first fastener that extends through the aperture of the first end of the torsion member and the passage of the first main beam and is coupled with the first portion of the first fastener, and a second end with an aperture extending therethrough and operably coupled with the second end of the second main beam by a second portion of the second fastener that extends through the aperture of the second end of the torsion member and the passage of the second main beam and is coupled with the first portion of the second fastener.

23. A vehicle suspension assembly, comprising:
a first main beam having a first end operably coupled to a vehicle frame, and a second end having an outwardly-extending first extension member having an aperture extending therethrough;
a second main beam having a first end operably coupled to a vehicle frame, and a second end having an outwardly-extending second extension member having an aperture extending therethrough;

a torsion member having a first end with a first aperture that receives the first extension member therein, and a second end with a second aperture that receives the second extension member therein;

a first threaded mechanical fastener that extends through the aperture of the first extension member and engages a first nut frictionally engaged by the first main beam, thereby coupling the first end of the torsion member with the second end of the first main beam;

a second threaded mechanical fastener that extends through the aperture of the second extension member and engages a second nut frictionally engaged by the second main beam, thereby coupling the second end of the torsion member with the second end of the second main beam;

a first washer disposed on a distal end of the first aperture of the torsion member relative to the first main beam; and a second washer disposed on a distal end of the second aperture of the torsion member relative to a second main beam.

24. The vehicle suspension assembly as set forth in claim 23, wherein the first and second washers are each bell-shaped and include a diameter substantially equal to or greater than an outer diameter of the first and second ends of the torsion member, respectively.

25. The vehicle suspension as set forth in claim 23, wherein the first and second extension members are integrally molded with the first and second main beams, respectively.

26. The vehicle suspension assembly as set forth in claim 23, wherein the first and second extensions each comprise a cylindrical tube.

* * * * *